(12) United States Patent
Yang

(10) Patent No.: US 6,766,017 B1
(45) Date of Patent: Jul. 20, 2004

(54) DIALING METHOD IN MOBILE TELEPHONE

(75) Inventor: Jae-Duk Yang, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/291,552

(22) Filed: Apr. 14, 1999

(30) Foreign Application Priority Data

Apr. 14, 1998 (KR) ........................................ 1998-13246

(51) Int. Cl.[7] ........................................... H04M 1/2745
(52) U.S. Cl. ............................... 379/355.02; 379/355.05
(58) Field of Search ........................... 379/355; 455/564

(56) References Cited

U.S. PATENT DOCUMENTS

| | | | | |
|---|---|---|---|---|
| 3,860,765 A | * | 1/1975 | McCabe et al. ....... | 379/355.01 |
| 5,034,976 A | * | 7/1991 | Sato ...................... | 379/355.06 |
| 5,553,125 A | * | 9/1996 | Martensson ............ | 379/199 |
| 5,592,546 A | | 1/1997 | Takahashi .............. | 379/355.05 |
| 5,708,804 A | | 1/1998 | Goodwin et al. ....... | 707/3 |
| 5,722,088 A | * | 2/1998 | Storn et al. ............ | 455/564 |
| 5,917,904 A | * | 6/1999 | Theis ..................... | 379/355.08 |
| 6,035,220 A | * | 3/2000 | Claudio et al. ......... | 379/355.02 |
| 6,097,808 A | * | 8/2000 | Chang ................... | 379/100.14 |
| 6,169,799 B1 | * | 1/2001 | McIntosh ............... | 379/354 |

FOREIGN PATENT DOCUMENTS

| | | | |
|---|---|---|---|
| EP | 0 567 333 | 4/1993 | |
| GB | 2 300 331 | 10/1996 | |
| JP | 4-236548 | 8/1992 | ........... H04M/1/274 |

* cited by examiner

*Primary Examiner*—F. W. Isen
*Assistant Examiner*—Daniel Swerdlow
(74) *Attorney, Agent, or Firm*—Dilworth & Barrese, LLP

(57) ABSTRACT

A dialing method in a mobile phone in which frequently used telephone numbers are stored in a first memory of the phone and less frequently used telephone numbers are stored in a second memory. Upon reception of input data comprising one or more digits from the phone keypad, the method searches the first memory for a stored telephone number that has a portion matching the input data. If a matching telephone number is found, it is displayed on the telephone display. If no matches are found in the first memory, a search of the second memory is performed to determine if a matching telephone number is stored therein. Whenever a matching telephone number from the first or second memory is displayed, the displayed number is automatically dialed upon reception of a command from the user, e.g., upon detection of a SEND key input.

18 Claims, 4 Drawing Sheets

| NAME | ADD | TEL |
|------|-----|--------------|
| YJD  | 1   | 053-300-4000 |
| KJM  | 2   | 0546-400-5000 |
| JST  | 3   | 0481-500-6000 |

FIG. 3A

| ORDER OF CALL | TEL |
|---------------|--------------|
| 1ST CALL | 053-200-3000 |
| 2ND CALL | 0482-100-2000 |

FIG. 3B

DIALING METHOD IN MOBILE TELEPHONE

BACKGROUND OF THE INVENTION

1. Field of the Invention

The present invention relates to a dialing method in a mobile telephone, and in particular, to a method for retrieving a telephone number stored in a mobile telephone by inputting part of the telephone number and dialing a retrieved telephone number.

2. Description of the Related Art

In a mobile telephone, it is inefficient for a user who frequently calls a certain party to dial the seven or higher digit telephone number of that party each time a call is placed. To solve this inefficiency, mobile telephones have been provided with a phone book function for storing frequently used telephone numbers for future use. When dialing a telephone number using the phone book function, the user presses a function key and a scroll key several times to retrieve a desired telephone number. Once the desired telephone number is retrieved, the number can be dialed automatically by means of another key entry by the user. This phone book function is useful for the purpose of dialing a telephone number that the user cannot remember correctly. However, the speed by which the number can be dialed from the start of the process is limited, since the user needs to press the scroll keys repeatedly until the desired telephone number is retrieved, even when the user already knows the number. In the worst case, the user may press the keys more times than the number of the digits in the telephone number.

In another approach, mobile telephones have been provided with a speed dial function for registering frequently used telephone numbers in association with unique speed dial keys. The user can dial the registered telephone numbers by pressing the associated speed dial keys, but needs to remember the telephone number or party associated with the respective speed dial keys. Accordingly, the user typically needs to separately note the telephone numbers or parties associated with the respective speed dial keys, which is cumbersome.

Another technique that has been attempted to facilitate dialing has been to equip the mobile phone with speech recognition means to implement a voice dialing function. Telephone numbers are registered in association with speech data input by the user for respective parties to be called. Upon reception and recognition of input speech matching stored speech data, the telephone number associated with the speech is dialed. This method, however, suffers from being susceptible to the surrounding noise, and has a relatively low dial success rate.

SUMMARY OF THE INVENTION

It is, therefore, an object of the present invention to provide a method which retrieves a telephone number when the user enters only a few digits of the telephone number to be dialed, and then dials the retrieved telephone number.

To achieve the above and other objects, there is provided a dialing method in a mobile phone which stores frequently used telephone numbers in a first memory of the phone and less frequently used telephone numbers in a second memory of the phone. Upon reception of input data comprising one or more digits from the phone keypad, the method searches the first memory for a stored telephone number that has a portion matching the input data. If a matching telephone number is found, it is displayed on the telephone display. If no matches are found in the first memory, a search of the second memory is performed, and if a matching telephone number is found, that number is displayed. Whenever a matching telephone number from the first or second memory is displayed, the displayed number is automatically dialed upon reception of a command from the user, e.g., upon detection of a SEND key input. If neither the first nor second memory has a telephone number with a portion matching the input numeric data, the mobile phone outputs the input numeric data to the display.

BRIEF DESCRIPTION OF THE DRAWINGS

The above and other objects, features and advantages of the present invention will become more apparent from the following detailed description when taken in conjunction with the accompanying drawings, in which:

FIGS. 3A and 3B are diagrams illustrating memory maps in which telephone numbers are stored.

DETAILED DESCRIPTION OF THE PREFERRED EMBODIMENT(S)

Figure 1:
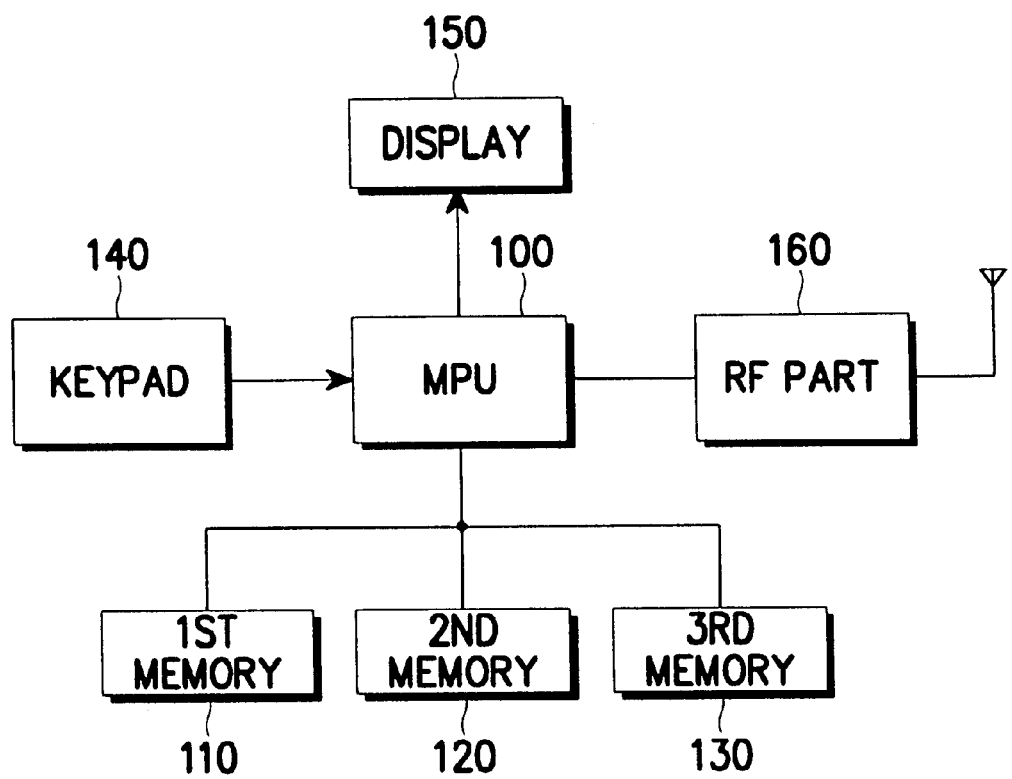
FIG. 1 is a block diagram of a mobile telephone in which the present invention may be embodied.

Referring to FIG. 1, a block diagram of a mobile telephone in which the present invention may be embodied is illustrated. The mobile telephone includes a microprocessor unit (MPU) 100, first, second and third memories 110–130, a keypad 140, a display 150 and an RF (radio frequency) part 160.

In operation, MPU 100 reads an operating program(s) and data from the first to third memories 110–130 and controls the overall operation of the mobile telephone (mobile phone). The first memory 110, which is preferably a nonvolatile memory such as an EEPROM (Electrically Erasable and Programmable Read Only Memory), stores RF parameters as well as data necessary for various functions of the mobile phone such as the phone book function. It is noted here that the term "phone book function", as used in this detailed description, refers to the novel function disclosed herein in which a pre-stored telephone number is automatically displayed upon detection of the first few digits of the telephone number input by the user. The term, of course, has a different meaning than the prior art phone book function discussed earlier.

In particular, the first memory 110 according to an embodiment of the present invention stores data for frequently used telephone numbers to realize the phone book function. The second memory 120, e.g., a volatile memory such as an SRAM (Static Random Access Memory), stores data necessary to access the MPU 100 and also stores telephone numbers input by the user during operation of the mobile phone. In particular, the second memory 120, according to an embodiment of the present invention, has a stack structure and stores less frequently used telephone numbers. The third memory 130, e.g., flash ROM, stores a control program of the mobile phone. The keypad 140 includes numeric keys for dialing and a SEND key, and generates key data according to the key input by the user. The SEND key is activated by the user to dial a telephone number displayed. The key data generated from the keypad 140 is provided to the MPU 100. The display 150 displays a status message of the mobile phone, the key data input from keypad 140 and the telephone number read from the memories 110 and 120, under the control of the MPU 100. The RF part 160 is an RF interface that transmits and receives an RF signal for communication, under the control of MPU 100.

Figure 2:
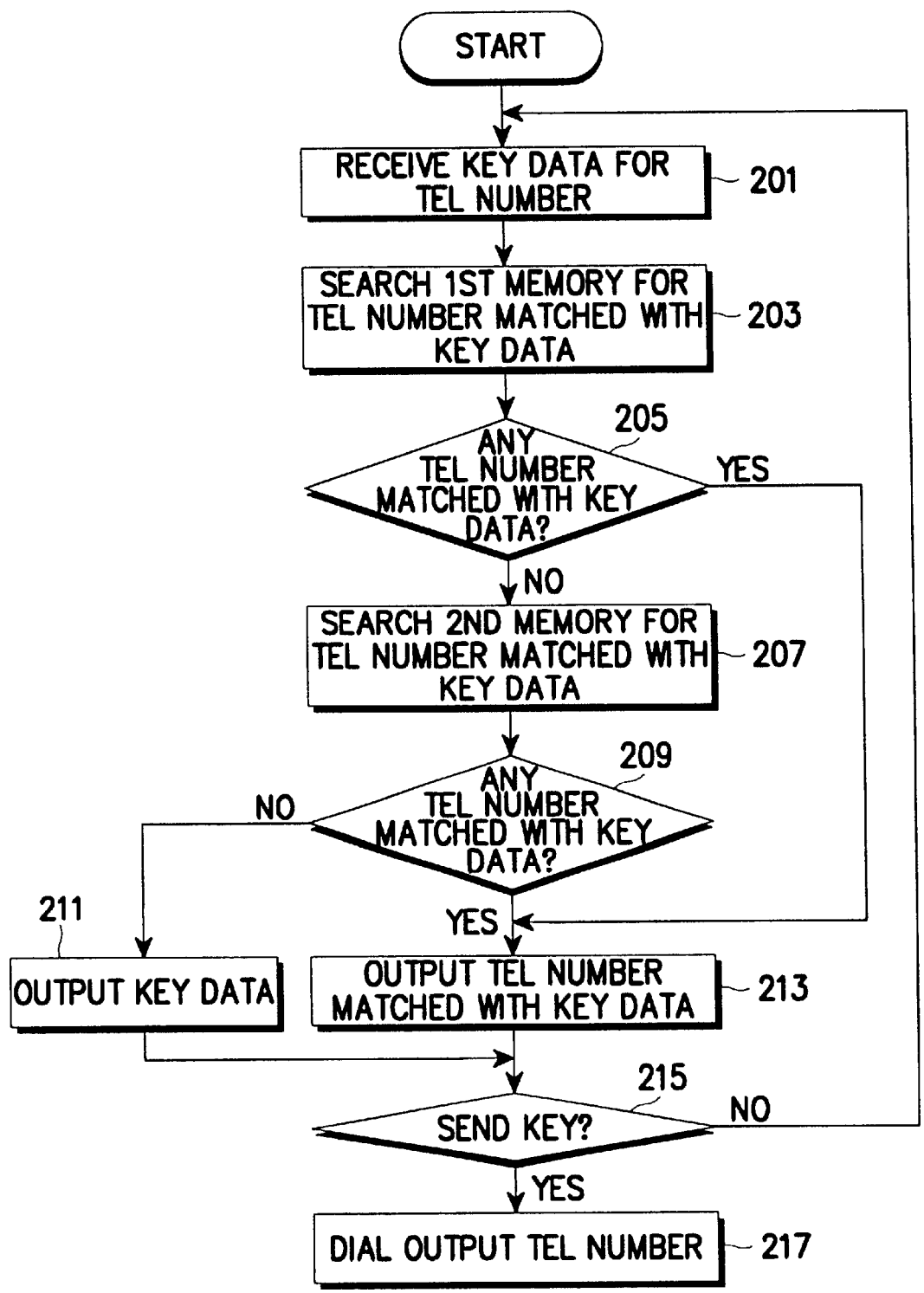
FIG. 2 is a flowchart illustrating a dialing method in a mobile telephone according to an embodiment of the present invention.

Referring now to the flowchart of FIG. 2 in conjunction with the block diagram of FIG. 1, an embodiment of the invention will be described in which the mobile phone retrieves a telephone number from the memories 110 and 120 by detecting only a few digits of the telephone number input by the user. Once these digits are detected, the corresponding telephone number stored in the mobile phone is retrieved and displayed, and then automatically dialed if a user command is received.

First, the user inputs a telephone number to dial, digit by digit, through the keypad 140, and MPU 100 receives the corresponding key data from keypad 140 in step 201. In step 203, the MPU 100 searches the first memory 110 for a telephone number matching the key data input by the user. This step is preferably performed after each digit input by the user. (Instead, the routine may be designed to await the reception of two or three initial digits of the number before performing an initial search.) The MPU 110 ascertains in step 205 whether or not the first memory 110 has a telephone number that matches the input key data. That is, to perform the phone book function for the input key data, the MPU 100 searches the first memory 110 and determines whether there exists one or more stored telephone numbers beginning with the input key data. Alternatively, the program can be designed to perform a further search for stored telephone numbers that have a tail portion matching the input data. For instance, if a user in the United States frequently dials different out of state phone numbers such as "1-516-579-2281" and "1-516-579-2390", the user is allowed to enter the end portion of the number first, e.g., "2281" or just "22". The program will then search the memory for telephone numbers beginning with "22" as well as those having "22" in the tail portion. In this manner, the speed at which the phone book function retrieves and displays the desired number may be faster in some circumstances, especially when many numbers with the same area code (516) and exchange (579) are stored.

When no matched telephone number is found in step 205, the MPU 100 searches the second memory 120 in step 207 for a telephone number with a portion matching the input key data, and determines if a match exits in step 209. For example, upon reception of the numeric data for a first digit of a telephone number that the user desires to dial, the MPU 100 compares the numeric data for the first digits of all the telephone numbers stored in the second memory 120 with the input numeric data, to determine whether any stored telephone numbers match the input data.

If the second memory 120 does not have a telephone number matching the input numeric data in step 209, the MPU 100 outputs the input numeric data to the display 150 in step 211. On the contrary, if in step 205 or 209 the first or second memory 110 or 120 is determined to have one or more matching telephone numbers, MPU 100 outputs the matching telephone number or numbers to the display 150 in step 213. When there are several telephone numbers matched with the input numeric data, the MPU 100 outputs them in a predetermined search order. For the telephone numbers stored in the first memory 110, this search order may be the order of storage, and for the telephone numbers stored in the second memory 120, this search order may be the inverse order of storage. (It is noted that a typical mobile phone display is only capable of displaying a single telephone number. As such, the method may optionally be designed to allow the user to use the scroll key to scroll down to the next matching number of the matching numbers retrieved, if more than one exist. In this case, the flow chart of FIG. 2 may be modified to proceed to step 207 following a "YES" determination in step 205 to retrieve any additional matches that exist from the second memory even though matches have been found in the first memory. The lower priority numbers would be last in the scrollable list.)

Accordingly, in the preferred embodiment, when there are several telephone numbers matching the input numeric data, the MPU 100 outputs the telephone number with the top priority to the display 150. Here, the telephone number with the top priority may be a most frequently used telephone number. As an alternative, the matching numbers may be output in numeric order. For instance, the number "579-2280" would be displayed prior to "579-2281", based on numeric order, if both of these numbers were found in memory. In any case, an abbreviated name of the party corresponding to each matching phone number may also be retrieved from memory and displayed along with the number.

If the telephone number displayed on the display 150 is identical to a telephone number that he/she desires to dial, the mobile telephone user will input the SEND key on the keypad 140. Otherwise, the user will input key data for a next digit of the telephone number to dial. If the program is designed to allow the user to scroll for matching numbers with lower priority at this point, the user has the option to do so, and to select one of such numbers by hitting the SEND key.

The MPU 100 then determines in step 215 whether or not the SEND key on the keypad 140 is pressed by the user. If the SEND key is pressed, the MPU 100 dials the telephone number currently displayed on the display 150 in step 217. However, if the SEND key is not pressed, the MPU 100 returns to step 201 to receive the key data for the next digit of the telephone number to be dialed.

FIG. 3A illustrates a memory map of the first memory 110, wherein the frequently used telephone numbers are stored in the order of address ADD. These frequently used numbers may be stored by MPU 100 during a setup process in which the user inputs the frequently used numbers along with the called party name for each number. Additionally, MPU 100 may automatically add a new number to the frequently used number list whenever it determines that the user has been calling that new number frequently in the normal calling mode. For instance, if MPU 100 determines that the new number has been called more than a predetermined number of times within a specific time period, MPU 100 may add that number to the list in the first memory. Further, MPU 100 can be programmed to dynamically change the priority order of the stored telephone numbers in each memory based on frequency of usage of the respective numbers, by keeping track of how many times each phone number in the first and second memories is dialed. With this dynamic approach, frequently used telephone numbers in the second memory may be transferred to the first memory as necessary, and vice versa.

FIG. 3B illustrates a memory map of the second memory 120, wherein the less frequently used telephone numbers are stored in the order of "call". By way of example, whenever a user dials a telephone number not previously stored in memory 110 or 120, the program may add this new number to the bottom of the list of FIG. 3B. In this manner, less frequently used numbers are stored in a calling order. Less frequently used numbers may also be input by the user during the setup process for storage in the second memory.

Figure 4:
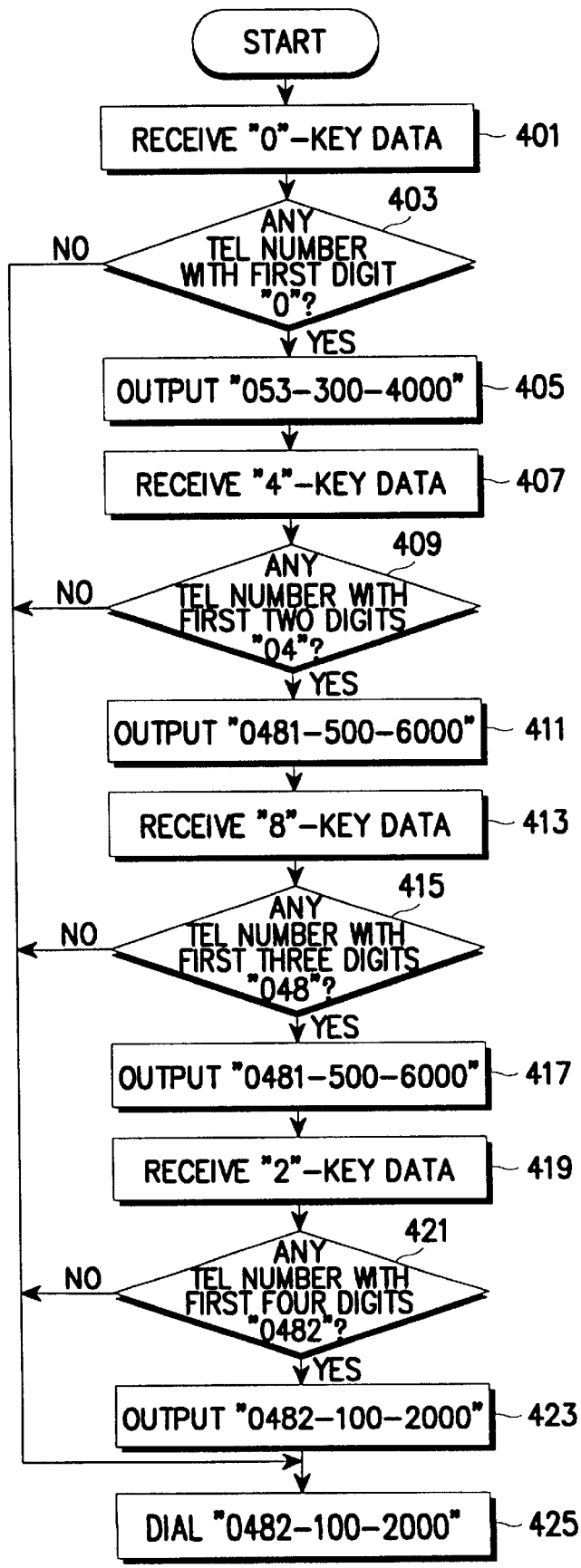
FIG. 4 is a flowchart illustrating a method for retrieving a telephone number stored in a mobile telephone and dialing the retrieved telephone number according to an embodiment of the present invention.

FIG. 4 is a flowchart illustrating the exemplary dialing method according to the present invention, on the assumption that the user desires to dial a telephone number "0482-100-2000", by way of example.

Referring collectively to FIGS. 1, 3A, 3B and 4, a detailed description will be given for the procedure of retrieving the telephone number stored in the mobile phone and dialing the retrieved telephone number according to an embodiment of the present invention when the user desires to dial the number "0482-100-2000". First, the user presses a first digit "0" of the telephone number to be dialed. The MPU 100 then receives first key data for the first digit "0" of the telephone number in step 401. Subsequently, the MPU 100 searches the first memory 110 for a telephone number whose first digit's key data is identical to the first key data, in step 403. That is, the MPU 100 searches the first memory 110 for the telephone number whose first digit is "0". For example, the first memory 110 may have several telephone numbers whose first digits are "0", as shown in FIG. 3A. In this case, the MPU 100 outputs to the display 150 the telephone number "053-300-4000" with the top priority among the telephone numbers whose first digits are "0", in step 405. The "top priority" number may be established either during the above-mentioned setup process or, during a learning process by MPU 100. In the latter case, MPU 100 determines which numbers have been dialed more frequently in the past by updating an internal counter whenever a particular number is dialed.

In the meantime, since the telephone number "053-300-4000" displayed on the display 150 is not the desired telephone number to be dialed, the user will press the next digit "4" of the telephone number to be dialed. Then, the MPU 100 receives second key data for the second digit "4" of the telephone number from the keypad 140 in step 407. The MPU 100 again searches the first memory 110 for a telephone number whose first two digits are "04" in step 409. The MPU 100 outputs the telephone number "0481-500-6000" whose first two digits are "04" to the display 150 in step 411.

Since the telephone number "0481-500-6000" is also not the telephone number to be dialed, the user will press the next digit "8" of the desired telephone number using the keypad 140. The MPU 100 then receives the third key data for the third digit "8" of the telephone number from the keypad 140 in step 413. Next, MPU 100 again searches the first memory 110 for a telephone number whose first three digits are "048" in step 415. The MPU 100 then outputs the telephone number "0481-500-6000" whose first three digits are "048" to the display 150 in step 417.

At this point, since the telephone number "0481-500-6000" is still not the desired number, the user will press the next digit "2" of the desired telephone number. The MPU 100 then receives the fourth key data for the fourth digit "2" of the telephone number from the keypad 140 in step 419. Subsequently, the MPU 100 searches the second memory 120 for a telephone number whose first four digits are "0482" in step 421. That is, the MPU 100 searches the first memory 110 for the telephone number matching the input numeric data and thereafter, searches the second memory 120 when the first memory 110 does not have telephone numbers matching the input numeric data.

The MPU 100 then reads the telephone number "0482-100-2000" whose first four digits are "0482" from the second memory 120 and outputs the read telephone number to the display 150 in step 423. Since the telephone number "0482-100-2000" is identical to the telephone number to dial, the user will press the SEND key. Upon detection of the SEND key input, the MPU 100 dials the telephone number "0482-100-2000" displayed on the display 150 in step 425.

As described above, by employing the novel dialing method, the user can dial a telephone number by pressing only a few digits of the telephone number to be dialed, without the need for inputting all the digits.

While the invention has been shown and described with reference to a certain preferred embodiment thereof, it will be understood by those skilled in the art that various changes in form and details may be made therein without departing from the spirit and scope of the invention. For instance, while the embodiment has been described in conjunction with information stored in three memories of the mobile telephone, more or fewer memories may be alternatively employed to perform the same functions. Also, the mobile phone may be alternatively designed without a two tier system of most frequently used and less frequently used telephone numbers. That is, only the most frequently used numbers may be stored in a single list in memory. Accordingly, these and other modifications are intended to be included within the scope of the invention as defined by the appended claims.

What is claimed is:

1. A dialing method in a mobile telephone having a keypad and a display, the method comprising the steps of:
   a) storing frequently used telephone numbers in a first memory oft he mobile telephone and less frequently used telephone numbers in a second memory of the mobile telephone;
   b) upon reception of numeric data input from the keypad, searching all numeric data included in every telephone number stored in the first memory for a telephone number having a portion matching the input numeric data;
   c) if the first memory has a telephone number matching the input numeric data, reading the matching telephone number from the first memory and outputting the read telephone number to the display;
   d) searching all numeric data included in every telephone number stored in the second memory for a telephone number matching the input numeric data when the first memory does not have a matching telephone number;
   e) if the second memory has a telephone number matching the input numeric data, reading the matching telephone number from the second memory and outputting the read telephone number to the display; and
   f) upon detection of a send key input, dialing the telephone number currently displayed on the display.

2. The dialing method as claimed in claim 1, further comprising the step of outputting the input numeric data to the display if the second memory does not have a telephone number matching the input numeric data.

3. The dialing method as claimed in claim 1, further comprising the step of receiving second numeric data input by the user if the send key input is not received, and repeating steps b) to f) for the second numeric data appended to the first numeric data.

4. The dialing method as claimed in claim 3, wherein the first numeric data is a single digit and the second numeric data is a single digit.

5. The dialing method as claimed in claim 3, wherein the first numeric data is at least two digits and the second numeric data is a single digit.

6. The dialing method as claimed in claim 1, wherein said step (b) of searching the first memory is performed by searching the first memory for a telephone number having a beginning portion matching the input data.

7. The dialing method as claimed in claim 1, wherein said step (b) is performed by searching the first memory for a telephone number having a beginning portion matching the input data and also searching the first memory for a telephone number having an end portion matching the input data.

8. The dialing method as claimed in claim 1, wherein if a plurality of telephone numbers in said first memory are determined to have a portion matching the input data, a matching telephone number having the highest priority among the plurality of matching telephone numbers is output to the display.

9. The dialing method as claimed in claim 8, wherein a matching telephone number with a next highest priority is displayed upon reception of a scroll key input.

10. The dialing method as claimed in claim 8, wherein said plurality of matching telephone numbers are displayed on said display in an order based on a dynamically determined frequency of usage of the plurality of matching telephone numbers.

11. The dialing method as claimed in claim 1, wherein said frequently used telephone numbers are stored in the first memory during a set-up mode.

12. The dialing method as claimed in claim 1, further comprising determining whether a new telephone number which is not currently stored within said first memory has been dialed by a user during a calling mode more than a predetermined number of times, and if so, storing said new telephone number as a new frequently used number in said first memory.

13. The dialing method as claimed in claim 1, wherein said less frequently used numbers are stored in the second memory during a set-up mode.

14. The dialing method as claimed in claim 1, wherein when a new telephone number is dialed by a user during a calling mode, it is stored as a said less frequently used number in said second memory.

15. A dialing method in a mobile telephone including a nonvolatile memory for storing frequently used telephone numbers and a volatile memory for storing less frequently used telephone numbers, the method comprising the steps of:

a) upon reception of first numeric data input by a user, searching all numeric data included in every telephone number stored in the nonvolatile memory for a telephone number including numeric data that is identical to the first numeric data;

b) if the nonvolatile memory has a telephone number whose first digit's numeric data is identical to the first numeric data, reading the telephone number with a top priority among the telephone numbers including numeric data is identical to the first numeric data from the nonvolatile memory and outputting the read telephone number to the display;

c) if the nonvolatile memory does not have a telephone number whose first digit's numeric data is identical to the first numeric data, searching all numeric data included in every telephone number stored in the volatile memory for a telephone number including numeric data that is identical to the first numeric data;

d) if the volatile memory has a telephone number whose first digit's numeric data is identical to the first numeric data, reading the telephone number with a top priority among the telephone numbers including numeric data that is identical to the first numeric data from the volatile memory and outputting the read telephone number to the display; and e) upon detection of a send key input in said step b) or d), dialing the telephone number displayed on the display.

16. The dialing method as claimed in claim 15, further comprising the step of receiving second numeric data input by the user if the send key input is not received, and repeating steps a) to e) for the second numeric data in combination with the first numeric data.

17. A dialing method in a mobile telephone having a keypad and a display, the method comprising the steps of:

a) storing frequently used telephone numbers in a first memory of the mobile telephone and storing less frequently used numbers in a second memory of the mobile telephone;

b) upon reception of numeric data input from the keypad, searching all numeric data included in every telephone number stored in the memory for a telephone number having a portion matching the input numeric data;

c) if the first memory has a telephone number matching the input numeric data, displaying the matching telephone number on said display;

d) searching all numeric data included in every telephone number stored in the second memory for a less frequently used number having a portion matching said input numeric data if no match was found for a frequently used number in step (b);

e) displaying a matching less frequently used number; and f) dialing the matching telephone number displayed upon reception of a specific command by the user.

18. The dialing method as claimed in claim 17, wherein said specific command is a send key input of the user.

\* \* \* \* \*